(12) United States Patent
Flockhart et al.

(10) Patent No.: US 7,711,104 B1
(45) Date of Patent: May 4, 2010

(54) MULTI-TASKING TRACKING AGENT

(75) Inventors: Andrew D. Flockhart, Thornton, CO (US); Kenneth R. Hackbarth, Westminster, CO (US); Thomas L. Hemm, Boulder, CO (US); Sarah Hildebrandt Kiefhaber, Longmont, CO (US); Joylee E. Kohler, Northglenn, CO (US); Gary Edward Olmsted, Ashby, MA (US); Jill B. Ziobro, Middletown, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1062 days.

(21) Appl. No.: 10/946,638

(22) Filed: Sep. 20, 2004

Related U.S. Application Data

(60) Provisional application No. 60/558,613, filed on Mar. 31, 2004.

(51) Int. Cl.
*H04M 3/00* (2006.01)
(52) U.S. Cl. .................. 379/265.03; 379/265.06; 379/265.09
(58) Field of Classification Search ........... 379/265.01, 379/265.03, 265.07, 265.08, 265.09
See application file for complete search history.

(56) References Cited

U.S. PATENT DOCUMENTS

| | | | |
|---|---|---|---|
| 4,163,124 A | 7/1979 | Jolissaint | |
| 4,389,400 A | 6/1983 | Ho | |
| 4,510,351 A | 4/1985 | Costello et al. | |
| 4,567,323 A | 1/1986 | Lottes et al. | 179/18 B |
| 4,737,983 A | 4/1988 | Frauenthal et al. | |
| 4,797,911 A | 1/1989 | Szlam et al. | |
| 4,894,857 A | 1/1990 | Szlam et al. | |
| 5,001,710 A | 3/1991 | Gawrys et al. | |
| 5,097,528 A | 3/1992 | Gursahaney et al. | |
| 5,101,425 A | 3/1992 | Darland | |
| 5,155,761 A | 10/1992 | Hammond | 379/67 |
| 5,164,981 A | 11/1992 | Mitchell et al. | |

(Continued)

FOREIGN PATENT DOCUMENTS

CA 2143198 1/1995

(Continued)

OTHER PUBLICATIONS

U.S. Appl. No. 12/022,850, filed Jan. 30, 2008, Flockhart et al.

(Continued)

*Primary Examiner*—Ahmad F Matar
*Assistant Examiner*—Antim Shah
(74) *Attorney, Agent, or Firm*—Sheridan Ross P.C.

(57) ABSTRACT

The present invention is directed to a system for tracking a contact center operation. The system includes a tracking agent 232 operable to (a) receive a notification indicating a change in agent focus from a first work item to a second work item; (b) determine whether the first work item involves a communication medium different from the second work item; and (c) when the first work item involves a communication medium different from the second work item, cause termination of a timer with respect to the servicing of the first work item and initiation of a timer with respect to the servicing of the second work item. The first and second work items are concurrently assigned for servicing to the agent.

37 Claims, 4 Drawing Sheets

U.S. PATENT DOCUMENTS

| | | | |
|---|---|---|---|
| 5,164,983 A | 11/1992 | Brown et al. | |
| 5,167,010 A | 11/1992 | Elm et al. | |
| 5,185,780 A | 2/1993 | Leggett | |
| 5,206,903 A | 4/1993 | Kohler et al. | 379/309 |
| 5,210,789 A | 5/1993 | Jeffus et al. | |
| 5,274,700 A | 12/1993 | Gechter et al. | |
| 5,278,898 A | 1/1994 | Cambray et al. | |
| 5,289,368 A | 2/1994 | Jordan et al. | |
| 5,291,550 A | 3/1994 | Levy et al. | 379/242 |
| 5,299,260 A | 3/1994 | Shaio | 379/265 |
| 5,309,513 A | 5/1994 | Rose | 379/265 |
| 5,325,292 A | 6/1994 | Crockett | |
| 5,335,268 A | 8/1994 | Kelly, Jr. et al. | |
| 5,335,269 A | 8/1994 | Steinlicht | 379/266 |
| 5,390,243 A | 2/1995 | Casselman et al. | |
| 5,436,965 A | 7/1995 | Grossman et al. | |
| 5,444,774 A | 8/1995 | Friedes | |
| 5,467,391 A | 11/1995 | Donaghue, Jr. et al. | |
| 5,469,503 A | 11/1995 | Butensky et al. | |
| 5,469,504 A | 11/1995 | Blaha | |
| 5,473,773 A | 12/1995 | Aman et al. | |
| 5,479,497 A | 12/1995 | Kovarik | |
| 5,499,291 A | 3/1996 | Kepley | |
| 5,500,795 A | 3/1996 | Powers et al. | |
| 5,504,894 A | 4/1996 | Ferguson et al. | |
| 5,506,898 A | 4/1996 | Costantini et al. | 379/266 |
| 5,530,744 A | 6/1996 | Charalambous et al. | |
| 5,537,470 A | 7/1996 | Lee | 379/266 |
| 5,537,542 A | 7/1996 | Eilert et al. | |
| 5,544,232 A | 8/1996 | Baker et al. | |
| 5,546,452 A | 8/1996 | Andrews et al. | 379/219 |
| 5,555,299 A | 9/1996 | Maloney et al. | |
| 5,577,169 A | 11/1996 | Prezioso | |
| 5,592,378 A | 1/1997 | Cameron et al. | 395/227 |
| 5,592,542 A | 1/1997 | Honda et al. | |
| 5,594,726 A | 1/1997 | Thompson et al. | 370/485 |
| 5,603,029 A | 2/1997 | Aman et al. | |
| 5,604,892 A | 2/1997 | Nuttall et al. | |
| 5,606,361 A | 2/1997 | Davidsohn et al. | 348/14 |
| 5,611,076 A | 3/1997 | Durflinger et al. | |
| 5,627,884 A | 5/1997 | Williams et al. | 379/67 |
| 5,642,515 A | 6/1997 | Jones et al. | |
| 5,684,872 A | 11/1997 | Flockhart et al. | 379/266 |
| 5,684,874 A | 11/1997 | Flockhart et al. | |
| 5,684,964 A | 11/1997 | Powers et al. | |
| 5,689,698 A | 11/1997 | Jones et al. | |
| 5,703,943 A | 12/1997 | Otto | |
| 5,713,014 A | 1/1998 | Durflinger et al. | |
| 5,721,770 A * | 2/1998 | Kohler | 379/265.12 |
| 5,724,092 A | 3/1998 | Davidsohn et al. | 348/14 |
| 5,740,238 A | 4/1998 | Flockhart et al. | 379/221 |
| 5,742,675 A | 4/1998 | Kilander et al. | |
| 5,742,763 A | 4/1998 | Jones | |
| 5,748,468 A | 5/1998 | Notenboom et al. | |
| 5,749,079 A | 5/1998 | Yong et al. | |
| 5,751,707 A | 5/1998 | Voit et al. | 370/384 |
| 5,752,027 A | 5/1998 | Familiar | |
| 5,754,639 A | 5/1998 | Flockhart et al. | 379/221 |
| 5,754,776 A | 5/1998 | Hales et al. | |
| 5,754,841 A | 5/1998 | Carino, Jr. | |
| 5,757,904 A | 5/1998 | Anderson | |
| 5,784,452 A | 7/1998 | Carney | |
| 5,790,642 A | 8/1998 | Taylor et al. | |
| 5,790,650 A | 8/1998 | Dunn et al. | |
| 5,790,677 A | 8/1998 | Fox et al. | 380/24 |
| 5,794,250 A | 8/1998 | Carino, Jr. et al. | |
| 5,796,393 A | 8/1998 | MacNaughton et al. | |
| 5,802,282 A | 9/1998 | Hales et al. | |
| 5,802,510 A | 9/1998 | Jones | |
| 5,818,907 A | 10/1998 | Maloney et al. | 379/34 |
| 5,819,084 A | 10/1998 | Shapiro et al. | |
| 5,825,869 A | 10/1998 | Brooks et al. | 379/265 |
| 5,826,039 A | 10/1998 | Jones | |
| 5,828,747 A | 10/1998 | Fisher et al. | 379/309 |
| 5,836,011 A | 11/1998 | Hambrick et al. | |
| 5,838,968 A | 11/1998 | Culbert | |
| 5,839,117 A | 11/1998 | Cameron et al. | 705/27 |
| 5,864,874 A | 1/1999 | Shapiro | |
| 5,875,437 A | 2/1999 | Atkins | 705/40 |
| 5,880,720 A | 3/1999 | Iwafune et al. | 345/327 |
| 5,881,238 A | 3/1999 | Aman et al. | |
| 5,884,032 A | 3/1999 | Bateman et al. | 395/200.34 |
| 5,889,956 A | 3/1999 | Hauser et al. | |
| 5,897,622 A | 4/1999 | Blinn et al. | 705/26 |
| 5,901,214 A | 5/1999 | Shaffer et al. | |
| 5,903,641 A | 5/1999 | Tonisson | 379/266 |
| 5,903,877 A | 5/1999 | Berkowitz et al. | 705/26 |
| 5,905,793 A | 5/1999 | Flockhart et al. | 379/266 |
| 5,909,669 A | 6/1999 | Havens | |
| 5,911,134 A | 6/1999 | Castonguay et al. | |
| 5,914,951 A | 6/1999 | Bentley et al. | |
| 5,915,012 A | 6/1999 | Miloslavsky | |
| 5,923,745 A | 7/1999 | Hurd | |
| 5,926,538 A | 7/1999 | Deryugin et al. | |
| 5,930,786 A | 7/1999 | Carino, Jr. et al. | |
| 5,937,051 A | 8/1999 | Hurd et al. | |
| 5,937,402 A | 8/1999 | Pandilt | |
| 5,940,496 A | 8/1999 | Gisby et al. | |
| 5,941,983 A | 8/1999 | Gupta et al. | |
| 5,943,416 A | 8/1999 | Gisby | 379/265 |
| 5,948,065 A | 9/1999 | Eilert et al. | |
| 5,960,073 A | 9/1999 | Kikinis et al. | |
| 5,963,635 A | 10/1999 | Szlam et al. | |
| 5,963,911 A | 10/1999 | Walker et al. | 705/7 |
| 5,970,132 A | 10/1999 | Brady | |
| 5,974,135 A | 10/1999 | Breneman et al. | |
| 5,974,462 A | 10/1999 | Aman et al. | |
| 5,982,873 A | 11/1999 | Flockhart et al. | 379/266 |
| 5,987,117 A | 11/1999 | McNeil et al. | |
| 5,991,392 A | 11/1999 | Miloslavsky | |
| 5,996,013 A | 11/1999 | Delp et al. | |
| 5,999,963 A | 12/1999 | Bruno et al. | |
| 6,000,832 A | 12/1999 | Franklin et al. | 364/479.02 |
| 6,011,844 A | 1/2000 | Uppaluru et al. | |
| 6,014,437 A | 1/2000 | Acker et al. | |
| 6,031,896 A | 2/2000 | Gardell et al. | |
| 6,038,293 A | 3/2000 | Mcnerney et al. | |
| 6,038,296 A | 3/2000 | Brunson et al. | |
| 6,044,144 A | 3/2000 | Becker et al. | |
| 6,044,205 A | 3/2000 | Reed et al. | 395/200.31 |
| 6,044,355 A | 3/2000 | Crockett et al. | |
| 6,049,547 A | 4/2000 | Fisher et al. | 370/412 |
| 6,049,779 A | 4/2000 | Berkson | |
| 6,052,723 A | 4/2000 | Ginn | |
| 6,055,308 A | 4/2000 | Miloslavsky et al. | |
| 6,058,179 A | 5/2000 | Shaffer et al. | |
| 6,064,730 A | 5/2000 | Ginsberg | 379/265 |
| 6,064,731 A | 5/2000 | Flockhart et al. | 379/265 |
| 6,084,954 A | 7/2000 | Harless et al. | 379/140 |
| 6,088,441 A | 7/2000 | Flockhart et al. | 379/265 |
| 6,097,885 A | 8/2000 | Rayner | |
| 6,108,670 A | 8/2000 | Weida et al. | |
| 6,115,462 A | 9/2000 | Servi et al. | |
| 6,128,304 A | 10/2000 | Gardell et al. | |
| 6,151,571 A | 11/2000 | Pertrushin | 704/209 |
| 6,154,769 A | 11/2000 | Cherkasova et al. | |
| 6,163,607 A | 12/2000 | Bogart et al. | 379/266 |
| 6,173,053 B1 | 1/2001 | Bogart et al. | 379/266 |
| 6,175,564 B1 | 1/2001 | Miloslavsky et al. | |
| 6,178,441 B1 | 1/2001 | Elnozahy | |
| 6,185,292 B1 | 2/2001 | Miloslavsky | |
| 6,185,603 B1 | 2/2001 | Henderson et al. | |
| 6,192,122 B1 | 2/2001 | Flockhart et al. | 379/266 |
| 6,215,865 B1 | 4/2001 | McCalmont | |

| Patent | Kind | Date | Inventor | Class |
|---|---|---|---|---|
| 6,226,377 | B1 | 5/2001 | Donaghue, Jr. | |
| 6,229,819 | B1 | 5/2001 | Darland et al. | |
| 6,230,183 | B1 | 5/2001 | Yocom et al. | |
| 6,233,333 | B1 | 5/2001 | Dezonmo | |
| 6,240,417 | B1 | 5/2001 | Eastwick et al. | |
| 6,259,969 | B1 | 7/2001 | Tackett et al. | 700/264 |
| 6,263,359 | B1 | 7/2001 | Fong et al. | |
| 6,272,544 | B1 | 8/2001 | Mullen | |
| 6,275,806 | B1 | 8/2001 | Pertrushin | 704/272 |
| 6,275,812 | B1 | 8/2001 | Haq et al. | 705/11 |
| 6,275,991 | B1 | 8/2001 | Erlin | 725/141 |
| 6,278,777 | B1 | 8/2001 | Morley et al. | 379/265 |
| 6,292,550 | B1 | 9/2001 | Burritt | 379/201 |
| 6,295,353 | B1 | 9/2001 | Flockhart et al. | 379/265 |
| 6,298,062 | B1 | 10/2001 | Gardell et al. | |
| 6,307,931 | B1 | 10/2001 | Vaudreuil | |
| 6,324,282 | B1 | 11/2001 | McIllwaine et al. | |
| 6,332,081 | B1 | 12/2001 | Do | |
| 6,339,754 | B1 | 1/2002 | Flanagan et al. | |
| 6,353,810 | B1 | 3/2002 | Petrushin | 704/236 |
| 6,356,632 | B1 | 3/2002 | Foster et al. | |
| 6,360,222 | B1 | 3/2002 | Quinn | |
| 6,363,411 | B1 | 3/2002 | Dugan et al. | |
| 6,366,666 | B2 | 4/2002 | Bengtson et al. | |
| 6,366,668 | B1 | 4/2002 | Borst et al. | 379/266.04 |
| 6,373,836 | B1 | 4/2002 | Deryugin et al. | |
| 6,389,028 | B1 | 5/2002 | Bondarenko et al. | 370/401 |
| 6,389,132 | B1 | 5/2002 | Price et al. | 379/265 |
| 6,389,400 | B1 | 5/2002 | Bushey et al. | 705/7 |
| 6,411,682 | B1 | 6/2002 | Fuller et al. | |
| 6,424,709 | B1 | 7/2002 | Doyle et al. | |
| 6,426,950 | B1 | 7/2002 | Mistry | |
| 6,427,137 | B2 | 7/2002 | Petrushin | 704/273 |
| 6,430,282 | B1 | 8/2002 | Bannister et al. | 379/211.02 |
| 6,434,230 | B1 | 8/2002 | Gabriel | 379/265.01 |
| 6,446,092 | B1 | 9/2002 | Sutter | |
| 6,449,356 | B1 | 9/2002 | Dezonno | 379/265.01 |
| 6,449,358 | B1 | 9/2002 | Anisimov et al. | |
| 6,449,646 | B1 | 9/2002 | Sikora et al. | |
| 6,453,038 | B1 | 9/2002 | McFarlane et al. | 379/265.05 |
| 6,463,148 | B1 | 10/2002 | Brady | |
| 6,463,346 | B1 | 10/2002 | Flockhart et al. | 700/102 |
| 6,463,415 | B2 | 10/2002 | St. John | 704/273 |
| 6,463,471 | B1 | 10/2002 | Dreke et al. | |
| 6,480,826 | B2 | 11/2002 | Pertrushin | 704/270 |
| 6,487,290 | B1 | 11/2002 | Le Grand | |
| 6,490,350 | B2 | 12/2002 | McDuff et al. | |
| 6,519,570 | B1 | 2/2003 | Faber et al. | |
| 6,535,600 | B1 | 3/2003 | Fisher et al. | 379/265.12 |
| 6,535,601 | B1 | 3/2003 | Flockhart et al. | 379/266.01 |
| 6,553,114 | B1 | 4/2003 | Fisher et al. | |
| 6,556,974 | B1 | 4/2003 | D'Alessandro | |
| 6,560,330 | B2 | 5/2003 | Gabriel | 379/265.02 |
| 6,560,649 | B1 | 5/2003 | Mullen et al. | |
| 6,560,707 | B2 | 5/2003 | Curtis et al. | |
| 6,563,920 | B1 | 5/2003 | Flockhart et al. | 379/265.1 |
| 6,571,285 | B1 | 5/2003 | Groath et al. | |
| 6,574,599 | B1 | 6/2003 | Lim et al. | |
| 6,574,605 | B1 | 6/2003 | Sanders et al. | |
| 6,587,831 | B1 | 7/2003 | O'Brien | |
| 6,597,685 | B2 | 7/2003 | Miloslavsky et al. | 370/352 |
| 6,603,854 | B1 | 8/2003 | Judkins et al. | |
| 6,604,084 | B1 | 8/2003 | Powers et al. | |
| 6,614,903 | B1 | 9/2003 | Flockhart et al. | 379/265.12 |
| 6,650,748 | B1 | 11/2003 | Edwards et al. | |
| 6,668,167 | B2 | 12/2003 | McDowell et al. | |
| 6,675,168 | B2 | 1/2004 | Shapiro et al. | |
| 6,687,257 | B1 | 2/2004 | Balasubramanian | |
| 6,700,967 | B2 | 3/2004 | Kleinoder et al. | |
| 6,704,409 | B1 | 3/2004 | Dilip et al. | |
| 6,707,903 | B2 | 3/2004 | Burok et al. | 379/265.02 |
| 6,711,253 | B1 | 3/2004 | Prabhaker | |
| 6,714,643 | B1 | 3/2004 | Gargeya et al. | |
| 6,718,330 | B1 | 4/2004 | Zenner | |
| 6,735,299 | B2 | 5/2004 | Krimstock et al. | |
| 6,735,593 | B1 | 5/2004 | Williams | |
| 6,738,462 | B1 | 5/2004 | Brunson | |
| 6,744,877 | B1 | 6/2004 | Edwards | |
| 6,748,414 | B1 | 6/2004 | Bournas | |
| 6,757,362 | B1 | 6/2004 | Cooper et al. | |
| 6,766,013 | B2 | 7/2004 | Flockhart et al. | 379/255.02 |
| 6,766,014 | B2 | 7/2004 | Flockhart et al. | 379/265 |
| 6,766,326 | B1 | 7/2004 | Cena | |
| 6,772,202 | B2 | 8/2004 | Wright | |
| 6,775,377 | B2 | 8/2004 | McIllwaine et al. | |
| 6,785,666 | B1 | 8/2004 | Nareddy et al. | |
| 6,801,520 | B2 | 10/2004 | Philonenko | |
| 6,822,945 | B2 | 11/2004 | Petrovykh | |
| 6,829,348 | B1 | 12/2004 | Schroeder et al. | |
| 6,839,735 | B2 | 1/2005 | Wong et al. | |
| 6,842,503 | B1 | 1/2005 | Wildfeuer | |
| 6,847,973 | B2 | 1/2005 | Griffin et al. | |
| 6,850,613 | B2 | 2/2005 | McPartlan et al. | |
| 6,859,529 | B2 | 2/2005 | Duncan et al. | |
| 6,898,190 | B2 | 5/2005 | Shtivelman et al. | |
| 6,915,305 | B2 | 7/2005 | Subramanian et al. | |
| 6,947,988 | B1 | 9/2005 | Saleh | |
| 6,968,052 | B2 | 11/2005 | Wullert, II | |
| 6,968,509 | B1 * | 11/2005 | Chang et al. | 715/802 |
| 6,970,554 | B1 * | 11/2005 | Peterson et al. | 379/266.1 |
| 6,981,061 | B1 | 12/2005 | Sakakura | |
| 6,985,901 | B1 | 1/2006 | Sachse et al. | |
| 6,988,126 | B2 | 1/2006 | Wilcock et al. | |
| 7,010,542 | B2 | 3/2006 | Trappen et al. | |
| 7,013,344 | B2 | 3/2006 | Megiddo | |
| 7,020,254 | B2 | 3/2006 | Phillips | |
| 7,039,176 | B2 | 5/2006 | Borodow et al. | |
| 7,062,031 | B2 | 6/2006 | Becerra et al. | |
| 7,072,966 | B1 | 7/2006 | Benjamin et al. | |
| 7,076,051 | B2 | 7/2006 | Brown et al. | |
| 7,100,200 | B2 | 8/2006 | Pope et al. | |
| 7,110,525 | B1 | 9/2006 | Heller et al. | |
| 7,117,193 | B1 | 10/2006 | Basko et al. | |
| 7,127,058 | B2 | 10/2006 | O'Connor et al. | |
| 7,133,520 | B1 | 11/2006 | Doyle et al. | |
| 7,136,873 | B2 | 11/2006 | Smith et al. | |
| 7,142,666 | B1 * | 11/2006 | Bates et al. | 379/421 |
| 7,149,733 | B2 | 12/2006 | Lin et al. | |
| 7,155,612 | B2 | 12/2006 | Licis | |
| 7,158,628 | B2 | 1/2007 | McConnell et al. | |
| 7,162,469 | B2 | 1/2007 | Anonsen et al. | |
| 7,165,075 | B2 | 1/2007 | Harter et al. | |
| 7,170,976 | B1 | 1/2007 | Keagy | |
| 7,170,992 | B1 | 1/2007 | Knott et al. | |
| 7,177,401 | B2 | 2/2007 | Mundra et al. | |
| 7,200,219 | B1 | 4/2007 | Edwards et al. | |
| 7,203,655 | B2 | 4/2007 | Herbert et al. | |
| 7,212,625 | B1 | 5/2007 | McKenna et | |
| 7,215,744 | B2 | 5/2007 | Scherer | |
| 7,246,371 | B2 | 7/2007 | Diacakis et al. | |
| 7,257,597 | B1 | 8/2007 | Pryce et al. | |
| 7,266,508 | B1 | 9/2007 | Owen et al. | |
| 7,272,223 | B2 | 9/2007 | McCormack et al. | |
| 7,283,805 | B2 | 10/2007 | Agrawal | |
| 7,295,669 | B1 | 11/2007 | Denton et al. | |
| 7,299,259 | B2 | 11/2007 | Petrovykh | |
| 7,346,532 | B2 | 3/2008 | Kusama et al. | |
| 7,372,857 | B2 | 5/2008 | Kappler et al. | |
| 7,373,309 | B2 | 5/2008 | Nishikawa et al. | |
| 7,376,127 | B2 | 5/2008 | Hepworth et al. | |
| 7,382,773 | B2 | 6/2008 | Schoeneberger et al. | |
| 7,392,402 | B2 | 6/2008 | Suzuki | |
| 7,406,098 | B2 | 7/2008 | Taneja et al. | |
| 7,409,423 | B2 | 8/2008 | Horvitz et al. | |
| 7,418,093 | B2 | 8/2008 | Knott et al. | |
| 7,418,094 | B2 | 8/2008 | Golitsin et al. | |

| | | |
|---|---|---|
| 7,478,051 B2 | 1/2009 | Nourbakhsh et al. |
| 7,526,440 B2 | 4/2009 | Walker et al. |
| 7,545,925 B2 | 6/2009 | Williams |
| 7,567,653 B1 | 7/2009 | Michaelis |
| 2001/0040887 A1 | 11/2001 | Shtivelman et al. |
| 2001/0056349 A1 | 12/2001 | St. John |
| 2002/0002460 A1 | 1/2002 | Pertrushin |
| 2002/0002464 A1 | 1/2002 | Petrushin |
| 2002/0010587 A1 | 1/2002 | Pertrushin |
| 2002/0012186 A1 | 1/2002 | Nakamura et al. |
| 2002/0019829 A1 | 2/2002 | Shapiro |
| 2002/0021307 A1 | 2/2002 | Glenn et al. |
| 2002/0029213 A1 | 3/2002 | Borissov et al. |
| 2002/0035605 A1 | 3/2002 | McDowell et al. |
| 2002/0038422 A1 | 3/2002 | Suwamoto et al. |
| 2002/0049589 A1* | 4/2002 | Poirier ............. 704/235 |
| 2002/0065894 A1 | 5/2002 | Dalal et al. |
| 2002/0076010 A1 | 6/2002 | Sahai |
| 2002/0085701 A1 | 7/2002 | Parsons et al. |
| 2002/0087630 A1 | 7/2002 | Wu |
| 2002/0112186 A1 | 8/2002 | Ford et al. |
| 2002/0116336 A1 | 8/2002 | Diacakis et al. |
| 2002/0116461 A1 | 8/2002 | Diacakis et al. |
| 2002/0194002 A1 | 12/2002 | Petrushin ............. 704/270 |
| 2003/0016812 A1 | 1/2003 | Rodenbusch et al. |
| 2003/0026414 A1 | 2/2003 | Baker et al. |
| 2003/0028621 A1 | 2/2003 | Furlong et al. |
| 2003/0073440 A1 | 4/2003 | Mukherjee et al. |
| 2003/0093465 A1 | 5/2003 | Banerjee et al. |
| 2003/0095652 A1 | 5/2003 | Mengshoel et al. |
| 2003/0108186 A1 | 6/2003 | Brown et al. |
| 2003/0123642 A1 | 7/2003 | Alvarado et al. ....... 379/266.01 |
| 2003/0144900 A1 | 7/2003 | Whitmer |
| 2003/0144959 A1 | 7/2003 | Makita |
| 2003/0154184 A1 | 8/2003 | Chee et al. |
| 2003/0174830 A1 | 9/2003 | Boyer et al. ........... 379/265.02 |
| 2003/0177017 A1 | 9/2003 | Boyer et al. ........... 705/1 |
| 2003/0177231 A1 | 9/2003 | Flockhart et al. ............ 709/225 |
| 2003/0182310 A1 | 9/2003 | Charnock et al. |
| 2003/0231647 A1 | 12/2003 | Petrovykh |
| 2003/0231757 A1 | 12/2003 | Harkreader et al. |
| 2004/0008828 A1 | 1/2004 | Coles et al. |
| 2004/0015496 A1 | 1/2004 | Anonsen |
| 2004/0015506 A1 | 1/2004 | Anonsen et al. |
| 2004/0054743 A1 | 3/2004 | McPartlan et al. |
| 2004/0057569 A1 | 3/2004 | Busey et al. |
| 2004/0103324 A1 | 5/2004 | Band |
| 2004/0138944 A1 | 7/2004 | Whitacre et al. |
| 2004/0162998 A1 | 8/2004 | Tuomi et al. |
| 2004/0202309 A1 | 10/2004 | Baggenstoss et al. |
| 2004/0210475 A1 | 10/2004 | Starnes et al. |
| 2004/0230675 A1 | 11/2004 | Freimuth et al. |
| 2004/0260706 A1 | 12/2004 | Anonsen et al. |
| 2005/0021529 A1 | 1/2005 | Hodson et al. |
| 2005/0041580 A1 | 2/2005 | Petrovykh |
| 2005/0044375 A1 | 2/2005 | Paatero et al. |
| 2005/0091071 A1 | 4/2005 | Lee |
| 2005/0125432 A1 | 6/2005 | Lin et al. |
| 2005/0125458 A1 | 6/2005 | Sutherland et al. |
| 2005/0138064 A1 | 6/2005 | Trappen et al. |
| 2005/0154708 A1 | 7/2005 | Sun |
| 2005/0182784 A1 | 8/2005 | Trappen et al. |
| 2005/0289446 A1 | 12/2005 | Moncsko et al. |
| 2006/0004686 A1 | 1/2006 | Molnar et al. |
| 2006/0007916 A1 | 1/2006 | Jones et al. |
| 2006/0045255 A1 | 3/2006 | Peters et al. |
| 2006/0056598 A1 | 3/2006 | Brandt et al. |
| 2006/0135058 A1 | 6/2006 | Karabinis |
| 2006/0178994 A1 | 8/2006 | Stolfo et al. |
| 2006/0242160 A1 | 10/2006 | Kanchwalla et al. |
| 2006/0256957 A1 | 11/2006 | Fain et al. |
| 2006/0271418 A1 | 11/2006 | Hackbart Jr. et al. |
| 2007/0038632 A1 | 2/2007 | Engstrom |
| 2007/0064912 A1 | 3/2007 | Kagan et al. |
| 2007/0083572 A1 | 4/2007 | Bland et al. |
| 2007/0112953 A1 | 5/2007 | Barnett |
| 2007/0127643 A1 | 6/2007 | Keagy |
| 2007/0192414 A1* | 8/2007 | Chen et al. ................. 709/205 |
| 2007/0201311 A1 | 8/2007 | Olson |
| 2007/0201674 A1 | 8/2007 | Annadata et al. |
| 2007/0230681 A1 | 10/2007 | Boyer et al. |
| 2008/0056165 A1 | 3/2008 | Petrovykh |
| 2008/0275751 A1 | 11/2008 | Flockhart et al. |
| 2008/0275752 A1 | 11/2008 | Flockhart et al. |
| 2008/0275766 A1 | 11/2008 | Flockhart et al. |
| 2009/0193050 A1 | 7/2009 | Olson |

FOREIGN PATENT DOCUMENTS

| | | |
|---|---|---|
| CA | 2174762 | 3/1996 |
| EP | 0 501 189 A2 | 9/1992 |
| EP | 0 740 450 A2 | 10/1996 |
| EP | 0 772 335 A2 | 5/1997 |
| EP | 0770967 | 5/1997 |
| EP | 0 829 996 A2 | 3/1998 |
| EP | 0 855 826 A2 | 7/1998 |
| EP | 0 863 651 A2 | 9/1998 |
| EP | 0 866 407 A1 | 9/1998 |
| EP | 0 899 673 A2 | 3/1999 |
| EP | 0 998 108 A1 | 5/2000 |
| EP | 1035718 | 9/2000 |
| EP | 1 091 307 A2 | 4/2001 |
| EP | 1 150 236 A2 | 10/2001 |
| EP | 1246097 | 10/2002 |
| GB | 2 273 418 | 6/1994 |
| GB | 2 290 192 A | 12/1995 |
| JP | 06-019861 | 1/1994 |
| JP | H7-005907 | 1/1995 |
| JP | 2001-053843 | 2/2001 |
| JP | 2002-051149 | 2/2002 |
| JP | 2002-297900 | 10/2002 |
| JP | 2006-054864 | 2/2006 |
| WO | WO 96/07141 | 3/1996 |
| WO | WO 97/28635 | 8/1997 |
| WO | WO 98/56207 | 12/1998 |
| WO | WO 99/17522 | 4/1999 |
| WO | WO 01/80094 | 10/2001 |
| WO | WO 01/80540 A1 | 10/2001 |
| WO | WO 02/099640 | 12/2002 |

OTHER PUBLICATIONS

U.S. Appl. No. 09/420,912, filed Oct. 20, 1999, J.A. Ford.
U.S. Appl. No. 10/673,103, filed Sep. 26, 2003, Flockhart et al.
U.S. Appl. No. 10/673,105, filed Sep. 26, 2003, Flockhart et al.
U.S. Appl. No. 10/673,115, filed Sep. 26, 2003, Flockhart et al.
U.S. Appl. No. 10/673,118, filed Sep. 26, 2003, Flockhart et al.
U.S. Appl. No. 10/815,534, filed Mar. 31, 2004, Flockhart et al.
U.S. Appl. No. 10/815,566, filed Mar. 31, 2004, Kiefhaber et al.
U.S. Appl. No. 10/815,584, filed Mar. 31, 2004, Kiefhaber et al.
U.S. Appl. No. 10/861,193, filed Jun. 3, 2004, Kiefhaber et al.
U.S. Appl. No. 10/891,346, filed Jul. 13, 2004, Flockhart et al.
Avaya, Inc., Business Advocate Product Summary, available at http://www.avaya.com, downloaded on Feb. 15, 2003, Avaya, Inc. 2003.
Avaya, Inc., Business Advocate Options, available at http://www.avaya.com, downloaded on Feb. 15, 2003, Avaya, Inc., 2003.
Avaya, Inc., CentreVu Advocate, Release 9, User Guide, Dec. 2000.
"Internet Protocol Addressing," available at http://samspade.org/d/ipdns.html, downloaded Mar. 31, 2003.
"Domain Name Services," available at http://www.pism.com/chapt09/chapt09.html, downloaded Mar. 31, 2003.
Bellsouth Corp., "Frequently Asked Questions—What is a registrar?," available at https://registration.bellsouth.net/NASApp/DNSWebUI/FAQ.jsp, downloaded Mar. 31, 2003.

Stevenson, Douglas, et al., "Name Resolution in Network and Systems Management Environments," available at http://netman.cit.buffalo.edu/Doc/DStevenson/NR-NMSE.html, downloaded Mar. 31, 2003.

Ahmed, Sarah, "A Scalable Byzantine Fault Tolerant Secure Domain Name System," thesis submitted to Massachusetts Institute of Technology, Department of Electrical Engineering and Computer Science, Jan. 22, 2001.

Coles, Scott, "A Guide for Ensuring Service Quality in IP Voice Networks," Avaya, Inc., 2002.

Avaya, Inc., "The Advantages of Load Balancing in the Multi-Call Center Enterprise," Avaya, Inc., 2002.

Foster, Robin, et al., "Avaya Business Advocate and its Relationship to Multi-Site Load Balancing Applications," Avaya, Inc., Mar. 2002.

Chavez, David, et al., "Avaya MultiVantage Software: Adapting Proven Call Processing for the Transition to Converged IP Networks," Avaya, Inc., Aug. 2002.

Avaya, Inc., "Voice Over IP Via Virtual Private Networks: An Overview," Avaya, Inc., Feb. 2001.

Avaya, Inc., "Better Implementation of IP in Large Networks." Avaya, Inc. 2002.

Doo-Hyun Kim et al. "Collaborative Multimedia Middleware Architecture and Advanced Internet Call Center"; ProceedingsInternational Conference on Information Networking (Jan. 31, 2001), pp. 246-250.

Presentation by Victor Zue, *The MIT Ox90ygen Project*, MIT Laboratory for Computer Science (Apr. 25-26, 2000).

MIT Project Oxygen, *Pervasive, Human-Centered Computing* (MIT Laboratory for Computer Science) (Jun. 2000).

E. Noth et al., "Research Issues for the Next Generation Spoken"; University of Erlangen-Nuremberg, Bavarian Research Centre for Knowledge-Based Systems, at http://www5.informatik.uni-erlangen.de/literature/psdir/1999/Noeth99:RIF.ps.gz.

L.F. Lamel and J.L. Gauvain, Language Identification Using Phone-Based Acoustic Likelihoods, ICASSP-94, 4 pages.

John H.L. Hansen and Levent M. Arslan, *Foreign Accent Classificatino Using Source Generator Based Prosodic Features*, IEEE Proc. ICASSP, vol. 1, pp. 836-839, Detroit USA (May 1995).

Levent M. Arslan and John H.L. Hansen, *Language Accent Classification in American English*, Robust Speech Processing Laboratory, Duke University Department of Electrial Engineering, Durham, NC, Technical Report RSPL-96-7, revised Jan. 29, 1996.

Levent M. Arslan, *Foreign Accent Classification in American English*, Department of Electrical Computer Engineering, Duke University, Thesis, pp. 1-200 (1996).

No Author, "When Talk Isn't Cheap" Sm@rt Reseller, v. 3, n. 13 (Apr. 3, 2000), p. 50.

No Author, "eGain's Commerce 2000 Platform Sets New Standard for eCommerce Customer Communications" Business Wire (Nov. 15, 1999).

Rabun, Andy and Jim Sommers. "Microsoft Project 98 Support Course", Microsoft Corporation. Jun. 1998, 879 pages.

"Microsoft Project 2000 Training Manual", Microsoft Corporation. 2000, 431 pages.

Spraetz, Out with the new, in with the old: A look at scheduling alternatives, Customer Inter@ction Solutions; Nov. 2001: 20,5.

www.EIX.com (1998-2002) (http://web.archive.org/web/20020803000353/http://www.iex.com): Totalview The Workforce Management Solution, TotalView Product Literature: The Perfect Fit.

www.EIX.com (1998-2002) (http://web.archive.org/web/20020803000353/http://www.iex.com): Totalview The Workforce Management Solution, TotalView Product Literature: TotalView's Agent Webstation.

Business Editors, Microdyne Outsourcing Rolls Out RightForce Workforce Management to Manage Bi-Coastal Contact Center and E-Services Staff Business Wire. New York: Dec. 4, 2001. p. 1.

Business Editors, High Tech Editors. IEX Enhances Award-Winning Workforce Management Solution Business Wire. New York: Jul. 31, 2001. p. 1.

Morris et al., Sardine: Dynamic Seller Strategies in an Auction Marketplace, EC'OO, ACM, Oct. 17-20, 2000, p. 128-134.

U.S. Appl. No. 10/946,638, Flockhart et al.

U.S. Appl. No. 11/069,739, Flockhart et al.

U.S. Appl. No. 11/064,367, Flockhart et al.

"Product Features," Guide to Call Center Automation, Brock Control Systems, Inc., Activity Managers Series™, Section 5—Company B120, p. 59, 1992.

"Product Features," Guide to Call Center Automation, CRC Information Systems, Inc., Tel-ATHENA, Section 5—Company C520, p. 95, 1992.

Dawson, "NPRI's Powerguide, Software Overview" Call Center Magazine (Jun. 1993), p. 85.

"Applications, NPRI's Predictive Dialing Package," Computer Technology (Fall 1993), p. 86.

"Call Center Software You Can't Outgrow," Telemarketing® (Jul. 1993), p. 105.

"VAST™, Voicelink Application Software for Teleservicing®," System Manager User's Guide, Digital Systems (1994), pp. ii, vii-ix, 1-2, 2-41 through 2-77.

GEOTEL Communications Corporation Web site printout entitled "Intelligent CallRouter" Optimizing the Interaction Between Customers and Answerin Resources. 6 pages, 1998.

Examiner's Refusal Decision dated Jul. 4, 2005 in Japanese Patent App. No. 2000-34266.

Examiner's Refusal Decision for Japanese Patent Application No. 2000-34267 dated Mar. 9, 2005 with translation, 4 pages.

Avaya, Inc., "Better Implementation of IP in Large Networks," Avaya, Inc. 2002, 14 pages.

Judge et al., Agent-enhanced workflow, BT Technologies Journal, vol. 16 No. 3, 1998.

Evenson et al., Effective Call Center Management: Evidence from Financial Services, The Wharton Financial Institutions Center, Jan. 1999.

Eder, Johann et al. "Time Management in Workflow Systems." BIS'99 3rd International Conference on Business Information Systems (1999).

Microsoft Corporation. "User's Guide: Microsoft Project: Business Project Planning System Version 4.1 for Windows 95 or Version 4.0 for Windows 3.1." 1995. pp. 1-40 (Chapters 1-4).

U.S. Appl. No. 11/199,828, filed Aug. 8, 2005, Bland et al.

U.S. Appl. No. 11/242,687, filed Oct. 3, 2005, Krimstock et al.

U.S. Appl. No 11/245,724, filed Oct. 6, 2005, Flockhart et al.

U.S. Appl. No. 11/517,646, filed Sep. 7, 2006, Hackbarth et al.

U.S. Appl. No. 11/536,456, filed Sep. 28, 2006, Hackbarth et al.

U.S. Appl. No. 11/861,857, filed Sep. 26, 2007, Tendick et al.

U.S. Appl. No. 12/242,916, filed Oct. 1, 2008, Kiefhaber et al.

"Avaya IQ - Building Upon the Strengths of CMS", White Paper, Feb. 2007, 11 pages.

"Call Center Recording for Call Center Quality Assurance", Voice Print International, Inc., available at http://www.voiceprintonline.com/call-center-recording.asp?ad_src=google&srch_trm=call_center_monitoring, date unknown, printed May 10, 2007, 2 pages.

"Dimensional database", Wikipedia, downloaded Aug 30, 2007 (3 pages).

"Driving Model Agent Behaviors With Avaya IQ", White Paper, Apr. 2007, 12 pages.

"KANA - Contact Center Support", available at http://www.kana.com/solutions.php?tid=46, copyright 2006, 3 pages.

"Learn the structure of an Access database", available at http://office.microsoft.com/en-us/access/HA012139541033.aspx, site updated Nov. 13, 2007, pp. 1-4.

"Monitoring: OneSight Call Statistics Monitors", available at http://www.empirix.com/default.asp?action=article&ID=301, date unknown, printed May 10, 2007, 2 pages.

"Oracle and Siebel" Oracle, available at http://www.oracle.com/siebel/index.html, date unknown, printed May 10, 2007, 2 pages.

"Services for Computer Supported Telecommunications Applications (CSTA) Phase III"; Standard ECMA-269, 5th Edition - Dec. 2002; ECMA International Standardizing Information and Communication Systems; URL: http://www.ecma.ch; pp. 1-666 (Parts 1-8).

"Still Leaving It to Fate?: Optimizing Workforce Management", Durr, William Jr., Nov., 2001.

"Access for 9-1-1 and Telephone Emergency Services," Americans with Disabilities Act, U.S. Department of Justice, Civil Rights Division (Jul. 15, 1998), available at http://www.usdoj.gov/crt/ada/911ta.htm, 11 pages.

A.A. Vaisman et al., "A Temporal Query Language for OLAP: Implementation and a Case Study", LNCS, 2001, vol. 2397, 36 pages.

A.B. Schwarzkopf, "Dimensional Modeling for a Data Warehouse", date unknown, 18 pages Printed/downloaded: Aug. 30, 2007.

An Expert's Guide to Oracle Technology blog, My Personal Dictionary, Lewis R. Cunningham, posted Mar. 31, 2005, http://blogs.ittoolbox.com/oracle'guide/archives003684.asp, 4 pages.

Andy Zmolek; "SIMPLE and Presence: Enterprise Value Propositions," Avaya presentation, 16 pages, presented Jan. 24, 2002.

Aspect - "Analysis and Reporting," http://aspect.com/products/analysis/index.cfm, (Copyright 2005) (1 page).

Aspect - "Call Center Reports," http://aspect.com/products/analysis/ccreporting.cfm, (Copyright 2005) (2 pages).

Aspect - "Performance Optimization," http://aspect.com/products/wfm/performanceopt.cfm?section=performanceopt, (Copyright 2005) (1page).

Atkins et a.l; "Common Presence and Instant Messaging: Message Format," Network Working Group (Jan. 9, 2003), available at http://www.ietforg/internet-drafts/draft-ietf-impp-cpim-msgfmt-08.txt, 31 pages.

Avaya - "Avaya and Blue Pumpkin - Providing Workforce Optimization Solutions" (Copyright 2004) (3 pages).

Avaya - "Avaya and Texas Digital Systems - Providing Real-time Access to Call Statistics" (Copyright 2004) (3 pages).

Avaya - "Avaya Basic Call Management System Reporting Desktop" (Copyright 2002) (4 pages).

Avaya - "Avaya Call Management System" (Copyright 2003) (3 pages).

Avaya - "Basic Call Management System Reporting Desktop," Product Description, http://www.avaya.com/gcm/master-usa/en-us/products/offers/bcmrs_desktop.htm (Copyright 2005) (2 pages).

Avaya - "Basic Call Management System Reporting Desktop," Product Features, http://vvww.avaya.com/gcm/master-usa/en-us/products/offers/bcmrs_desktop.htm (Copyright 2005) (2 pages).

Avaya - "Basic Call Management System Reporting Desktop," Product Overview, http://wwvv.avaya.com/gcm/master-usa/en-us/products/offers/bcmrs_desktop.htm (Copyright 2005) (2 pages).

Avaya - "Basic Call Management System Reporting Desktop," Product Technical, http://www.avaya.com/gcm/master-usa/en-us/products/offers/bcmrs_desktop.htm (Copyright 2005) (2 pages).

Avaya - "Call Management System," Product Description, http://www.avaya.com/gcm/master-usa/en-us/products/offers/call_management_system.htm (Copyright 2005) (2 pages).

Avaya - "Call Management System," Product Features, http://www.avaya.conn/gcm/master-usa/en-us/products/offers/call_management_system.htm (Copyright 2005) (3 pages).

Avaya - "Call Management System," Product Overview, http://www.avaya.com/gcm/master-usa/en-us/products/offers/call_management_system.htm (Copyright 2005) (2 pages).

Avaya - "Call Management System," Product Technical, http://www.avaya.com/gcm/masterusa/en-us/products/offers/call_management_system.htm (Copyright 2005) (2 pages).

Avaya - "Multi Channel Product Authorization," (PA) Version 5.0, (Nov. 2003) (6 pages).

Avaya IQ "Introducing Reporting and Analytics As You Designed It", 2007, 4 pages.

Berners-Lee et al.; "Uniform Resource Identifiers (URI); Generic Syntax," Network Working Group, Request for Comments 2396 (Aug. 1998), 38 pages.

Bill Michael, "The Politics of Naming" www.cConvergence.com (Jul. 2001) pp. 31-35.

Cherry, "Anger Management," IEEE Spectrum (Apr. 2005) (1 page).

ComputerWorld, ETL, M. Songini, at http://www.computerworld.com/databasetopics/businessintelligence/datawarehouse/story/ . . . . . ., copyright 2005, 5 pages.

Creating and Using Data Warehouse Dimension Tables (Microsoft) copyright 2005, http://msdn.microsoft.com/library/en-us/createdw/createdw_10kz.asp?frame=true, 3 pages.

Creating and Using Data Warehouse-Using Dimensional Modeling (Microsoft) downloaded May 18, 2005 http://msdn.microsoft.com/library/en-us/createdw/createdw_39z.asp?frame=true 1 page.

Crocker et al.; "Common Presence and Instant Messaging (CPIM)," Network Working Group (Aug. 14, 2002), available at http://www.iettorg/internet-drafts/draft-ietf-impp-cpim-03.txt, 33 pages.

CS 345: Topics in Data Warehousing, Oct. 5, 2004, 32 pages.

D. Browning et al., "Data Warehouse Design Considerations", Microsoft SQL 2000 Technical Articles, Dec. 2001, 24 pages (mistake - do not cite in family per DWS).

D. Smith, "Data Model Overview Modeling for the Enterprise While Serving the Individual", Teredata Global Sales Support, 2007, 33 pages.

Data Warehouse - Surrogate Keys, Keep Control Over Record Identifiers by Generating New Keys for the Data Warehouse, Ralph Kimball, May 1998, 4 pages.

Data Warehouse Designer - Design Constraints and Unavoidable Realities, No design Problem in School was This Hard, Ralph Kimball, Sep. 3, 2002, 3 pages.

Data Warehouse Designer - An Engineer's View - Its' Worthwhile to Remind Ourselves Why We Build Data Warehouses the Way We Do, Ralph Kimball, Jul. 26, 2002, 3 pages.

Data Warehouse Designer - Divide and Conquer, Build Your Data Warehouse One Piece at a Time, Ralph Kimball, Oct. 30, 2002, 3 pages.

Data Warehouse Designer - TCO Starts with the End User, Ralph Kimball, May 13, 2003 http://vvww.intelligententerprise.com/030513/608warehouse1_1.jhtml?_requestid=598425, 3 pages.

Data Warehouse Designer - The Soul of the Data Warehouse, Part One: Drilling Down, Ralph Kimball, Mar. 20, 2003, 3 pages.

Data Warehouse Designer - The Soul of the Data Warehouse, Part Three: Handling Time, Ralph Kimball, Apr. 22, 2003, 3 pages.

Data Warehouse Designer - The Soul of the Data Warehouse, Part Two: Drilling Across, Ralph Kimball, Apr. 5, 2003, 3 pages.

Data Warehouse Designer - Two Powerful Ideas, The Foundation for Modern Data Warehousing, Ralph Kimball, Sep. 17, 2002, 3 pages.

Data Warehouse Designer Fact Tables and Dimension, Jan. 1, 2003, http://www.inteeigententerprise.com/030101/602warehouse1_1.jhtml, Ralph Kimball, 3 pages.

Dawson et al.; "Vcard MIME Directory Profile," Network Working Group (Sep. 1998), available at http://www.ietf.org/rfc/rfc2426.txt?number=2426, 40 pages.

Day et al.; "A Model for Presence and Instant Messaging," Network Working Group (Feb. 2000), available at http://www.ietf.org/rfc/rfc2778.txt?number=2778, 16 pages.

Day et al.; "Instant Messaging/Presence Protocol Requirements," Network Working Group (Feb. 2000), available at http://www.ietf.org/rfc/rfc2779.txt?number=2779, 25 pages.

Definity Communications System Generic 3 Call Vectoring/Expert Agent Selection (EAS) Guide, AT&T publication No. 555-230-520 (Issue 3, Nov. 1993).

Dillion, "Renaming fields and tracing dependencies", available at http://allenbrowne.com/ser-41.html, Nov. 2003, updated May 2006, 1 page.

DMReview - Business Dimensional Modeling: The Logical Next Step: Translating the BDM Laura Reeves, published May 2004, 4 pages.

E. Veerman, "Designing A Dimensional Model", date unknown, 38 pages.

Fielding et al.; "Hypertext Transfer Protocol — HTTP/1.1," Network Working Group, Request for Comments 2068 (Jan. 1997), 152 pages.

Fundamentals of Data Warehousing - Unit 3 - Dimensional Modeling, Fundamentals of Data Warehousing, copyright 2005 - Evolve Computer Solutions, 55 pages.

G. Hellstrom et al., "RFC 2793 - RTP Payload for Text Consersation," Network Working Group Request for Comments 2793 (May 2000), available at http://www.faqs.org/rfcs/rfc2793.html, 8 pages.

G. Klyne; "A Syntax for Describing Media Feature Sets," Network Working Group (Mar. 1999), available at http://vvww.ietf.org/rfc/rfc2533.txt?number=2533, 35 pages.

G. Klyne; "Protocol-independent Content Negotiation Framework," Network Working Group (Sep. 1999), available at http://www.ietf.org/rfc/rfc2703.txt?number=2703, 19 pages.

G. Wiederhold, "Mediation to Deal with Heterogeneous Data Sources", Stanford University, Jan. 1999, 19 pages.

Glossary - Curlingstone Publishing, http://www.curlingstone.com/7002/7002glossary.html, downloaded May 24,2005, 11 pages.

Gulbrandsen et al.; "A DNS RR for Specifying the Location of Services (DNS SRV)," Network Working Group (Feb. 2000), available at http://www.ietf.org/rfc/rfc2782.txt?number=2782, 12 pages.

H. Schulzrinne et al., "RFC 2833 - RTP Payload for DTMF Digits, Telephony Tones and Telephony Signals," Network Working Group Request for Comments 2833 (May 2000), available at http://www.faqs.org/rfcs/rfc2833.html, 23 pages.

Holtman et al.; "HTTP Remote Variant Selection Algorithm — RVSA/1.0," Network Working Group (Mar. 1998), available at http://www.ietf.org/rfc/rfc2296.txt?number=2296, 13 pages.

Holtman et al.; "Transparent Content Negotiation in HTTP," Network Working Group (Mar. 1998), available at http://www.ietf.org/rfc/rfc2295.txt?number=2295, 55 pages.

Intelligent Enterprise Magazine - Data Warehouse Designer: Fact Tables and Dimension, downloaded May 18, 2005, http://www.intelligententerprise.com/030101/602warehouse1_1.jhtml, 7 pages.

J. Cahoon, "Fast Development of a Data Warehouse Using MOF, CWM and Code Generation", CubeModel, May-22, 2006, 32 pages.

J.E. Bentley, "Metadata: Everyone Talks About It, But What Is It?", First Union National Bank, date unknown, 5 pages.

Karakasidis A. "Queues for Active Data Warehousing", Jun. 17, 2005, Baltimore, MA, in Proceedings on Information Quality in Informational Systems (IQIS'2005), S.28-39, ISBN: 1-59593-160-0, DOI: 10.1109/DANTE.1999.844938.

Kimball, et al., "Practical Techniques for Extracting, Cleaning, Conforming, and Delivering Data." The Data Warehouse ETL Toolkit. 2004. Ch. 5, pp. 170-174.

Kimball, et al., "The Complete Guide to Dimensional Modeling." The Data Warehouse Toolkit. 2nd Edition, 2002. Ch. 11, pp. 240-241.

L. Cabibbo et al., "An Architecture for Data Warehousing Supporting Data Independence and Interoperability", International Journal of Cooperative Information Systems, Nov. 2004, 41 pages.

Microsoft Office Animated Help Tool, date unknown, 1 page.

Multi-Dimensional Modeling with BW ASAP for BW Accelerator Business Information Warehouse, copyright 2000, 71 pages.

NICE Systems - "Insight from Interactions," "Overwhelmed by the Amount of Data at your Contact Center?" http://www.nice.com/products/multimedia/analyzer.php, (Printed May 19, 2005) (2 pages).

NICE Systems - "Multimedia Interaction Products," "Insight from Interactions," http://www.nice.com/products/multimedia/contact_centers.php (Printed May 19, 2005) (3 pages).

Nortel - "Centrex Internet Enabled Call Centers," http://www.products.nortel.com/go/product_assoc.jsp?segId=0&pariD=0&catID=-9191&rend_id . . . (Copyright 1999-2005) (1page).

O. Boussaid et al., "Integration and dimensional modeling approaches for complex data warehousing", J. Global Optimization, vol. 37, No. 4, Apr. 2007, 2 pages.

Richard Shockey, "ENUM: Phone Numbers Meet the Net" www.cConvergence.com (Jul. 2001) pp. 21-30.

Rose et al..; "The APEX Presence Service," Network Working Group (Jan. 14, 2002), available at http://www.ietf.org/internet-drafts/draft-ietf-apex-presence-06.txt, 31 pages.

Sarda, "Temporal Issues in Data Warehouse Systems", 1999, Database Applications in Non-Traditional Environments (DANTE'99), S. 27, DOI: 10.1109/DANTE.1999.844938.

Snape, James, "Time Dimension and Time Zones." 2004. pp. 1-10. http://www.jamessnape.me.uk/blog/CommentView,gui,79e910a1-0150-4452-bda3-e98df.

Sugano et al. ;"Common Presence and Instant Messaging (CPIM) Presence Information Data Format," Network Working Group (Dec. 2002), available at http://www.ietf.org/internet-drafts/draft-ietf-impp-cpim-pidf-07.txt, 26 pages.

Thayer Watkins, "Cost Benefit Analysis", 1999, San Jose State University Economics Department, Web Archive http://web.arch ive.org/web/19990225143131 /http://www.sjsu.edu/faculty/watkins/cba.htm.

The Importance of Data Modeling as a Foundation for Business Insight, Larissa Moss and Steve Hoberman, copyright 2004, 38 pages.

US 6,537,685, 03/2003, Higuchi (withdrawn)

* cited by examiner

MULTI-TASKING TRACKING AGENT

CROSS REFERENCE TO RELATED APPLICATION

Cross reference is made to copending U.S. patent application Ser. Nos. 10/815,566, filed Mar. 31, 2004, entitled "USING AGENT PATTERNS FOR PREDICTIVE AGENT ASSIGNMENTS"; 10/815,534, filed Mar. 31, 2004, entitled "TRACKING AND ACTING ON ONE AND DONE"; 10/815,584, filed Mar. 31, 2004, entitled "USING TRUE VALUE IN ROUTING WORK ITEMS TO RESOURCES"; and 10/861,193, filed Jun. 3, 2004, entitled "DATA MODEL OF PARTICIPATION IN MULTI-CHANNEL AND MULTI-PARTY CONTACTS" (claiming priority from U.S. Provisional Application Ser. No. 60/558,613, filed Mar. 31, 2004, of the same title), each of which is incorporated herein by this reference.

FIELD OF THE INVENTION

The present invention is directed generally to servicing a contactor in a contact center and specifically to monitoring the performance of contact center resources.

BACKGROUND OF THE INVENTION

Contact centers, such as Automatic Call Distribution or ACD systems, are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are customer-specifiable (i.e., programmable by the operator of the contact center), via a capability called vectoring. Normally in present-day ACDs when the ACD system's controller detects that an agent has become available to handle a contact, the controller identifies all predefined contact-handling skills of the agent (usually in some order of priority) and delivers to the agent the highest-priority oldest contact that matches the agent's highest-priority skill. Generally, the only condition that results in a contact not being delivered to an available agent is that there are no contacts waiting to be handled.

An important factor in administering call distribution algorithms and rewarding agents based on performance is accurate tracking and reporting of agent performance. In monitoring agent performance, two areas are particularly troublesome. First, how should one track the previewing of work that is new or has been deferred while deciding what to do next? As will be appreciated, when an agent previews a work item, he or she is typically provided with a summary or condensed description of one or more work items (which can include, for example, contactor identity, nature or subject of the contact, arrival time, type of media, and intended recipient) and, based on the description, decides whether he or she is qualified or otherwise able to service the contact and/or prepares himself or herself to service the contact. Consideration must be given to performance when scrolling through a list of work items, like email, in a preview mode prior to selecting a work item. Second, how should one track work time when it appears that the agent is working on more than one thing simultaneously? For example, an agent is handling a first contact on a first communication medium (e.g., a live voice contact) for a first customer while at the same time handling a second contact on a second communication medium (e.g., an email or Web chat) for a second customer. More specifically, the agent does not have the first or second contact on hold while intermittently working on or wrapping up the other contact (completing the after call work). It is desirable to track accurately the agent's time for each work item. Inaccurate tracking can lead to nonsensical results, such as showing agents being present for more time than they are actually present and/or showing agent occupancy levels greater than 100%. Such erroneous results can propagate into significant errors in administering the call distribution algorithm. Moreover in some applications, the contact center may wish to discourage multi-tasking due to a concomitant decrease in the quality of service.

While tracking voice contacts is well established and accurate in the industry, the tracking of other channels or communication media (e.g., email, chat) is neither established nor accurate. For example, an agent using Avaya Inc.'s Interaction Center™ can read an entire email or web chat by previewing it and have that time counted as idle time or against another work item. It is only when the agent replies (because it requires explicit input) that accurate accounting for that email or web chat begins. Since it is impossible to know what work item an agent is thinking about without explicit agent input, multi-tasking tracking has not been done effectively. For example, the agent can be listening to a caller while at the same time concentrating on reading an email or web chat.

SUMMARY OF THE INVENTION

These and other needs are addressed by the various embodiments and configurations of the present invention. The invention is directed generally to a contact center that tracks previewing and/or multi-tasking operations for improved contact center efficiency.

In a first embodiment of the present invention, a method for tracking a contact center operation is provided. The method includes the steps:

(a) receiving a notification indicating a change in agent focus from a first work item to a second work item;

(b) determining whether the first work item involves a communication medium different from the communication medium of the second work item; and (c) when the first work item involves a communication medium different from the communication medium of the second work item, terminating a timer with respect to the servicing of the first work item and initiating a timer with respect to the servicing of the second work item. Because the agent is multi-tasking, the first and second work items are concurrently assigned for servicing to the agent. As will be appreciated, multi-tasking, by its very nature, requires the first and second work items to be carried by different communication media.

The notification commonly indicates that (i) the agent has switched from servicing the first work item, possibly involving a first communication medium, to servicing a second work item, possibly involving a different second communication medium, and/or (ii) the agent has switched from servicing the first work item to previewing of the second work item. The first and second communication media, for example, can each be a set of one or more of circuit-switched voice, packet-switched voice, email, instant messaging, text chat, voice messages, faxes, and scanned documents.

The notification may involve the incidence or occurrence of a cursor marker and/or a voice marker while the agent is servicing the first work item. The cursor marker indicates a cursor location and/or activity. For example, the location of the cursor marker can be in a specific window, and/or the activity of the cursor can be typing, clicking on an icon, idle, and the like. The voice marker indicates an amount and/or type of voice energy being transmitted and/or received by the agent while the agent is servicing the first work item. The amount and type of voice energy can be monitored by known techniques, for example, to identify auto-acknowledge responses, music on hold, active discussion between two endpoints, silence on one or both voice paths, key word recognition, and the like.

In response to the receipt of a notification, the agent's GUI and/or TUI can be returned to a previous configuration associated with the second work item. For example, the change to the GUI can be returning the GUI to a previous configuration, such as displaying of information previously displayed to the agent.

A counter can be used to track the number of times during a selected time period that the agent is engaged in a specified type of activity, such as previewing, and/or the number of times the agent returns to a selected work item.

The present invention can have a number of advantages over the prior art. First, the present invention can permit accurate tracking of multi-tasking and previewing activities. This capability will allow contact center operators to realize significant productivity increases that multi-tasking can enable and permit agents able to engage successfully in multi-tasking to be recognized and rewarded. Second, the present invention can permit contact centers to control selected types of multi-tasking to avoid potential decreases in the quality of customer service.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to provide improved contact processing.

Figure 1:
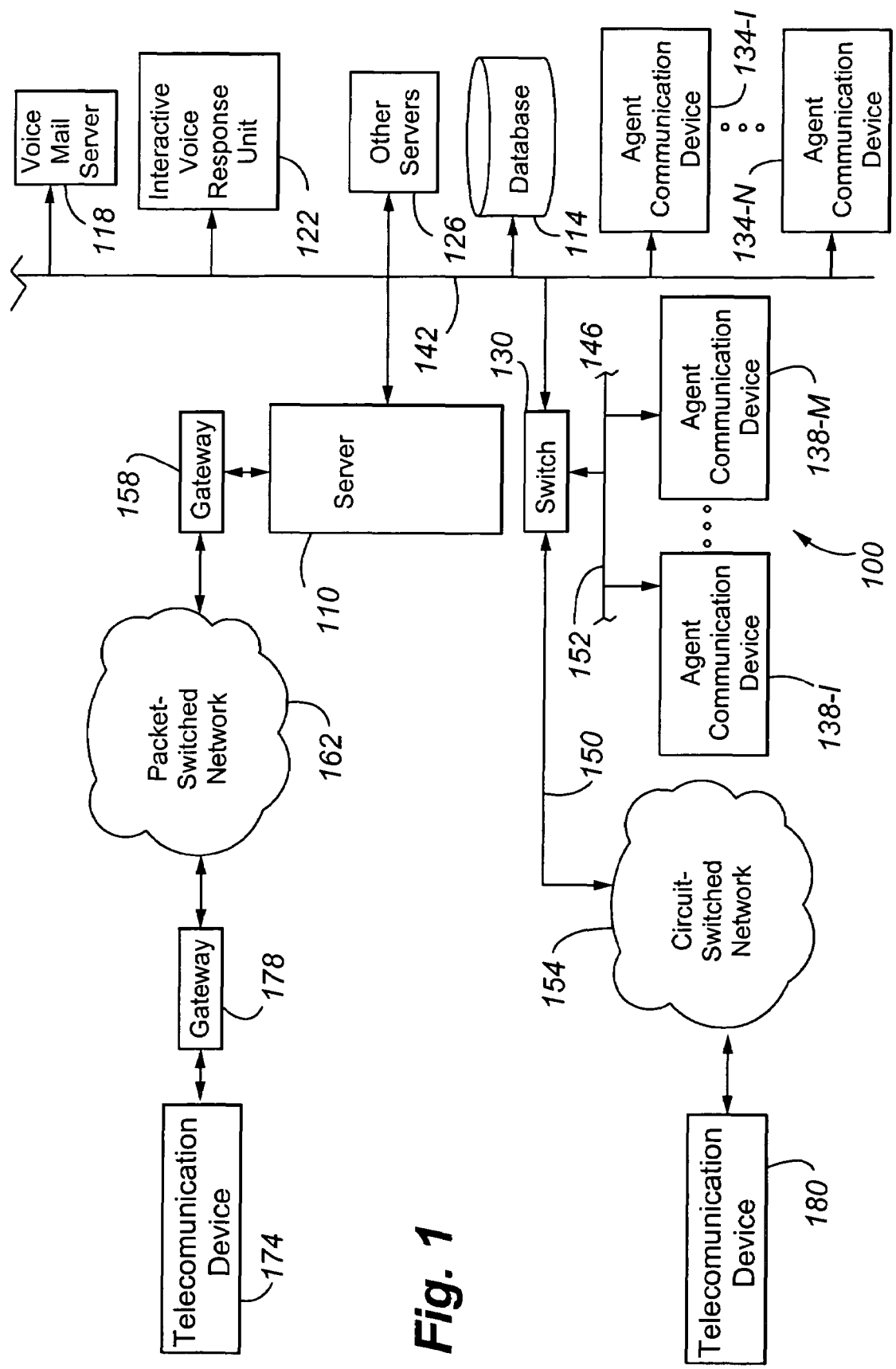
FIG. 1 is a block diagram depicting a contact center according to an embodiment of the present invention.

FIG. 1 shows an illustrative embodiment of the present invention. A contact center 100 comprises a central server 110, a set of data stores or databases 114 containing contact or customer related information and other information that can enhance the value and efficiency of the contact, and a plurality of servers, namely a voice mail server 118, an Interactive Voice Response unit or IVR 122, and other servers 126, a switch 130, a plurality of working agents operating packet-switched (first) telecommunication devices 134-1 to N (such as computer work stations or personal computers), and/or circuit-switched (second) telecommunication devices 138-1 to M, all interconnected by a local area network LAN (or wide area network WAN) 142. The servers can be connected via optional communication lines 146 to the switch 130. As will be appreciated, the other servers 126 can also include a scanner (which is normally not connected to the switch 130 or Web server), VoIP software, video contact software, voice messaging software, an IP voice server, a fax server, a web server, and an email server) and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, or other type of telecommunications system switch or server, as well as other types of processor-based communication control devices such as media servers, computers, adjuncts, etc.

Figure 2:
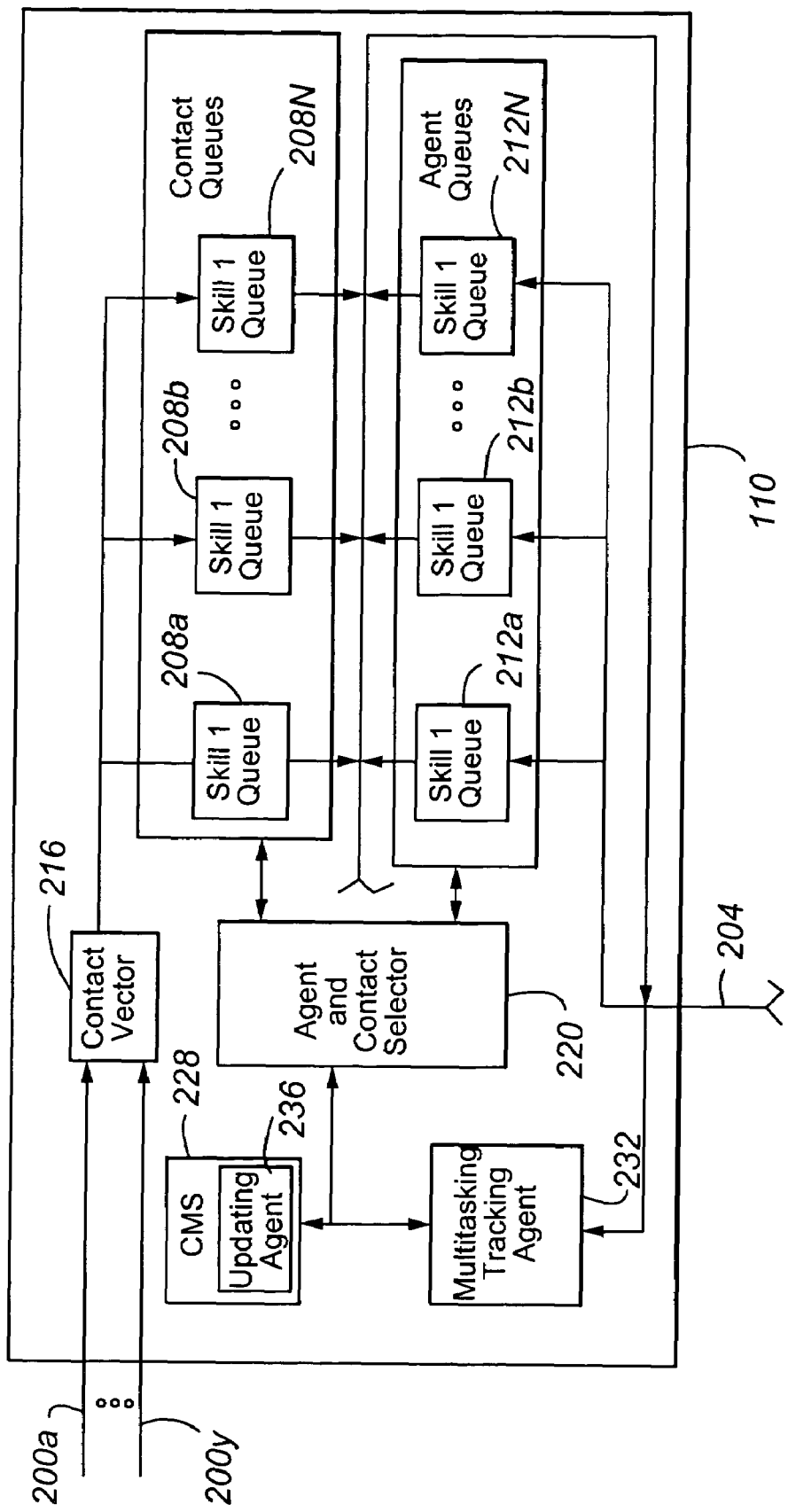
FIG. 2 is a block diagram of a server according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 140). The server 110 can include Avaya Inc.'s Operational Analyst™ or OA 224 with On-Line Analytical Processing or OLAP technology or a Call Management System or CMS 228 that gathers contact records and contact-center statistics for use in generating contact-center reports. OA and CMS will hereinafter be referred to jointly as CMS 228.

The switch 130 and/or server 110 can be any architecture for directing contacts to one or more telecommunication devices. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; Multi-Vantage™ PBX, CRM Central 2000 Server™, Communication Manager™, S8300™ media server, and/or Avaya Interaction Center™. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (not shown) to provide services to the serviced telecommunication devices. Other types of known switches and servers are well known in the art and therefore not described in detail herein.

Referring to FIG. 2, included among the data stored in the server 110 is a set of contact queues 208a-n and a separate set of agent queues 212a-n. Each contact queue 208a-n corresponds to a different set of agent skills, as does each agent queue 212a-n. Conventionally, contacts are prioritized and either are enqueued in individual ones of the contact queues 208a-n in their order of priority or are enqueued in different ones of a plurality of contact queues that correspond to a different priority. Likewise, each agent's skills are prioritized according to his or her level of expertise in that skill, and either agents are enqueued in individual ones of agent queues 212a-n in their order of expertise level or are enqueued in different ones of a plurality of agent queues 212a-n that correspond to a skill and each one of which corresponds to a different expertise level. Included among the control programs in the server 110 is a contact vector 216. Contacts incoming to the contact center are assigned by contact vector 216 to different contact queues 208a-n based upon a number of predetermined criteria, including customer identity, customer needs, contact center needs, current contact center queue lengths, customer value, and the agent skill that is required for the proper handling of the contact. Agents who are available for handling contacts are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skills and secondary skills in another configuration), and hence may be assigned to different agent queues 212a-n at different expertise levels. Call vectoring, one type of contact routing, is described in DEFINITY Communications System Generic 3 Call Vectoring/Expert Agent Selection (EAS) Guide, AT&T publication no. 555-230-520 (Issue 3, Nov. 1993). Skills-based ACD is described in further detail in U.S. Pat. Nos. 6,173,053 and 5,206,903.

Referring to FIG. 1, the gateway 158 can be Avaya Inc.'s, G700 Media Gateway™ and may be implemented as hardware such as via an adjunct processor (as shown) or as a chip in the server.

The first telecommunication devices 134-1, ... 134-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second telecommunication devices 138-1, ... 138-M are circuit-switched. Each of the telecommunication devices 138-1, ... 138-M corresponds to one of a set of internal extensions Ext1, ... ExtM, respectively. These extensions are referred to herein as "internal" in that they are extensions within the premises that are directly serviced by the switch. More particularly, these extensions correspond to conventional telecommunication device endpoints serviced by the switch/server, and the switch/server can direct incoming contacts to and receive outgoing contacts from these extensions in a conventional manner. The second telecommunication devices can include, for example, wired and wireless telephones, PDAs, H.320 video phones and conferencing units, voice messaging and response units, and traditional computer telephony adjuncts.

It should be noted that the invention does not require any particular type of information transport medium between switch or server and first and second telecommunication devices, i.e., the invention maybe implemented with any desired type of transport medium as well as combinations of different types of transport medium.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with an external first telecommunication device 174 via a gateway 178, and the circuit-switched network 154 with an external second telecommunication device 180. These telecommunication devices are referred to as "external" in that they are not directly supported as telecommunication device endpoints by the switch or server. The telecommunication devices 174 and 180 are an example of devices more generally referred to herein as "external endpoints."

In a preferred configuration, the server 110, network 162, and first telecommunication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user telecommunication devices, and other elements as shown in FIG. 1 is for purposes of illustration only and should not be construed as limiting the invention to any particular arrangement of elements.

As will be appreciated, the central server 110 is notified via LAN 142 of an incoming contact by the telecommunications component (e.g., switch 130, fax server, email server, web server, and/or other server) receiving the incoming contact. The incoming contact is held by the receiving telecommunications component until the server 110 forwards instructions to the component to forward or route the contact to a specific contact center resource, such as the IVR unit 122, the voice mail server 118, and/or first or second telecommunication device 134, 138 associated with a selected agent. The server 110 distributes and connects these contacts to telecommunication devices of available agents based on the predetermined criteria noted above. When the central server 110 forwards a voice contact (or first work item) to an agent, the central server 110 also forwards customer-related information from databases 114 to the agent's computer work station for viewing (such as by a pop-up display) to permit the agent to better serve the customer. When multi-tasking is desired, the central server 110 can forward a second work item on other media types (e.g., email, instant messaging, text or Web chat, and the like) to be handled simultaneously with the first work item. Depending on the contact center configuration, the central server may forward a list of work items to an available agent to preview before forwarding the contact itself and the data associated therewith to the agent. The agents process the contacts or work items sent to them by the central server 110. This embodiment is particularly suited for a Customer Relationship Management (CRM) environment in which customers are permitted to use any medium to contact a business. In a CRM environment, both real-time and non-real-time contacts must be handled and distributed with equal efficiency and effectiveness.

According to the invention, included among the programs executing on the server 110 are an agent and contact selector 220, multi-tasking tracking agent 232, and database updating agent 236. The selector 220 and tracking agent 232 are stored either in the main memory or in a peripheral memory (e.g., disk, CD ROM, etc.) or some other computer-readable medium of the center 100. The selector 220 and agent 232 collectively effect an assignment between available contacts and available agents in a way that tends to maximize contact center efficiency. The selector 220 uses predefined criteria, particularly the agent profile, in selecting an appropriate agent to service the contact. The tracking agent 232, by a combination of limiting agent work handling operations that cause work tracking ambiguity and by taking advantage of various markers or indicators available from the agents, applications, and affected channels, accurately tracks agent previewing and multi-tasking activities. This information, along with other statistics gathered by the CMS 228, is used by the selector 220 in distributing available work items to available agents. The updating agent 236 is the interface to the database 114 that updates the database records, including agent and customer profiles, in response to update notifications received from other applications, including the tracking agent 232.

The agent and customer profiles are typically maintained and updated by a profile generator (not shown). Upon the completion of handling a contact, the generator collects selected metrics for the contact. These metrics include the skill involved in servicing the contact, the identifier of the servicing agent, the contact duration, the transaction or contact type (e.g., catalog sale, information request, complaint, etc.), the time-of-day, the result (e.g., the type of sale, the number of units sold, revenue generated, service ticket closure or escalation, the information provided, etc.), a self-rating of the servicing agent respecting the agent's proficiency in handling the contact, the rating of the customer of the agent's proficiency in handling the contact, the rating of another party, such as the agent's supervisor or another observer, of how the contact was serviced, whether the agent requested assistance, and whether the agent's training was completed, and stores the information in the database 114, such as CMS 228. The metrics over a selected period of time are typically stored under each profile. Each agent profile typically includes metrics associated with a plurality of contacts serviced by the agent for each agent skill, and each customer profile includes metrics associated with a plurality of contacts by the customer.

Returning again to the tracking agent 232, the tracking agent removes tracking ambiguity, for example, by restricting what can be done by the agent and requiring the agent to take explicit action by activating a work item before beginning to work on the item. The time to service the work item can be accurately monitored by monitoring such actions by the agent. For example, if the agent is not shown the body of the work item until he/she explicitly activates it, then the agent's time spent reading the body of the message will be tracked accurately. In a further example, when the agent is on a voice call (or first work item) and elects to work on a second work item in a different communication medium, such as email, instant message, and Web chat, the voice call is automatically put on hold or the outgoing voice communications channel (or talk path) from the agent to the customer is otherwise blocked or disabled (while permitting the agent to continue to receive voice communications from the customer) when the agent initiates work on the second work item. When the agent wishes to return to the first work item, he or she must remove the call from hold status or otherwise request the outgoing channel to be enabled for outgoing communications from the agent to the customer. The request (such as "line one please") can be automatically generated when certain types (e.g., keywords) and/or levels of voice energy are provided by the agent for transmission to the customer over the talk path. In that event, the spoken voice energy is buffered until the talk path is reactivated or enabled and thereafter transmitted to the customer.

The tracking agent 232 can assume an agent is working on a second item rather than a first item when the agent spends more than a predetermined time in the second item. In particular, when the agent spends more than a predetermined threshold of time previewing a particular work item the tracking agent would treat that period of time plus any ensuing previewing time as time spent working on the previewed item. This threshold permits the agent to scroll through an email, for instance, and only when the agent stops to read the email does time tracking against the work item being previewed begin.

The tracking agent 232 can further monitor for markers or indicators to identify whether or not the customer is in work mode and what work item the agent is currently servicing. The markers include, for example, a cursor marker, a voice marker, and a video marker (e.g., particular movement).

The cursor marker indicates cursor (window) location and/or activity (e.g., typing, clicking on an icon, selecting a window, etc.). For example, when the cursor is located in a particular window and/or is active in that window the agent 232 can assume that the agent is working on a specific work item associated with the window or is not working (e.g., is in preview mode), depending on the information displayed in the window. Alternatively, engagement on a different work item can be detected implicitly in the application (e.g., receiving a request to preview a work list, movement through a work list, another work item is activated by clicking on an icon or window, or a new unrelated application is brought up by the agent by clicking on an icon).

The voice marker indicates the amount and type of voice energy being transmitted and/or received by the agent. A voice energy detector (not shown), such as a call classifier, can identify, on the one hand, when a particular speaker is engaged actively in a conversation (or the agent is working on the voice call) or, on the other hand, when the particular speaker is on auto-acknowledge (e.g., saying something like "yes", "ah ha", "yah", "no", "ok", or "nah" every few seconds) to keep the other person talking, when energy other than voice energy (such as music on hold) is being transmitted/received, and/or when no voice energy is detected on either the outgoing or incoming talk path for a determined time period (or the agent is not working on the voice call). When the voice energy detector detects voice energy from only one party over a selected length of time, the tracking agent 232 may conclude that the agent is not actively servicing the work item associated with the voice communication.

In applications where multi-tasking is to be discouraged, when the agent is servicing a work item the tracking agent can restrict information regarding other work items being displayed to the agent. For example, the subject of the other work item can be omitted from a display of information regarding the work item.

Whenever the tracking agent 232 detects that an agent is engaged on a different work item, the previous work item is automatically stopped from a tracking perspective and tracking starts on the new work item. For example, if an agent is talking with a customer and the agent activates an email by opening it, the call work time ends and the email work time begins. While an agent can only have work time accumulating for one work item at a time, one can track the amount of time an agent spends with more than one work item active (i.e., the amount of time spent multi-tasking). When work time is automatically stopped on an existing work item because the agent engages on a new work item, the existing work item could have additional time tracking of "engaged elsewhere (or non-work-item-specific) time."

The tracking agent 232 may also automatically alter the agent's Graphical User Interface or GUI and/or Telephone User Interface or TUI when the tracking agent detects a change in work items. For example, when the agent returns again to a voice communication from an email the tracking agent 232 may cause a previously provided display of information associated with the voice communication (e.g., customer profile and/or other context of the particular contact) to be displayed again to the agent. By way of further illustration, the tracking agent 232 in the foregoing example may cause the configuration/control settings of the TUI of the agent to change.

Figure 3:
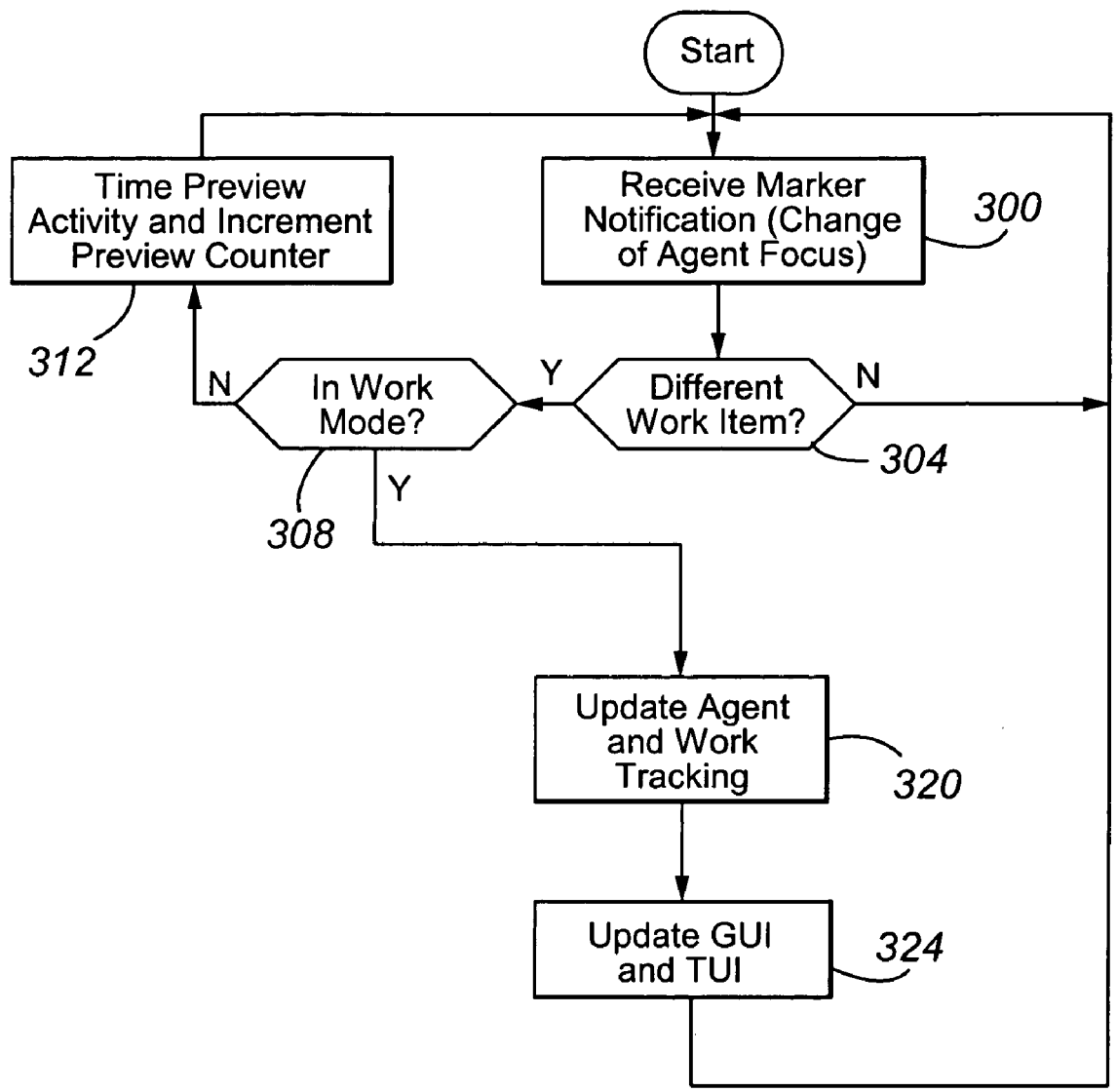
FIG. 3 is a flow chart depicting an operational embodiment of the multi-tasking tracking agent.

The operation of the tracking agent 232 will now be discussed with reference to FIG. 3.

In step 300, the tracking agent 232 receives a marker notification (or notification of a change of agent focus) from an application in the contact center. As noted, the marker notification typically refers to the incidence of a marker or a command issued by or on behalf of the agent.

In decision diamond 304, the tracking agent 232 determines whether the marker notification is issued in respect of a change by the corresponding agent from a first work item on a first communication medium or set of communication media to a different (second) work item on a different (second) communication medium or set of communication media. For example, when the first work item is a voice communication, the second work item is associated with a nonvoice communication medium, such as email, instant messaging, and Web or text chat. When the first work item is a text communication, the second work item is associated with a voice communication medium, such as a circuit-switched voice call, Voice Over IP or VoIP, and the like. When the marker notification is issued with respect to a change related to the communication medium of the current active work item of the human agent, the tracking agent 232 assumes that the human agent has not changed to a second different work item while the first work item is still active. When the notification does not relate to a different communication medium, the notification is deemed to be insignificant with regard to multi-tasking (but it may still be significant with regard to tracking the agent's time since the agent focus has changed from one contact to another) and the tracking agent 232 returns to step 300 and awaits the next notification. When the notification does relate to a different communication medium, the tracking agent 232 proceeds to decision diamond 308.

In decision diamond 308, the tracking agent 232 determines whether or not the agent that is the subject of the notification is in work mode. The non-work mode is deemed to apply when the agent is performing activities not related directly to a given work item. For example, the preview or work item selection operation is considered to be an activity in the non-work mode except as noted above. The agent can also be idle for a predetermined period of time and be considered to be in the non-work mode. The work mode, conversely, is deemed to apply when the agent is performing activities related directly to a given work item, such as conversing with a customer, preparing to service a work item before receipt of the work item, wrapping up the work item after the contact, and the like.

When the notification is from a marker or activity that is not considered to be the work mode, the tracking agent 232 proceeds to step 312 and causes the updating agent to stop the timer for the currently active work item and start a timer for the non-work mode activity (e.g., preview) and increment a non-work or preview counter, as desired. The counter tracks the number of times over a specified time period that the agent performs a non-work function, such as a preview. The tracking agent 232 then returns to step 300 and awaits the next notification.

When the notification is from a marker or activity that is considered to be the work mode, the tracking agent 232 proceeds to decision diamond 320.

In step 320, the tracking agent 232 issues an update notification to update the agent and work tracking records in the database 114.

Figure 4:
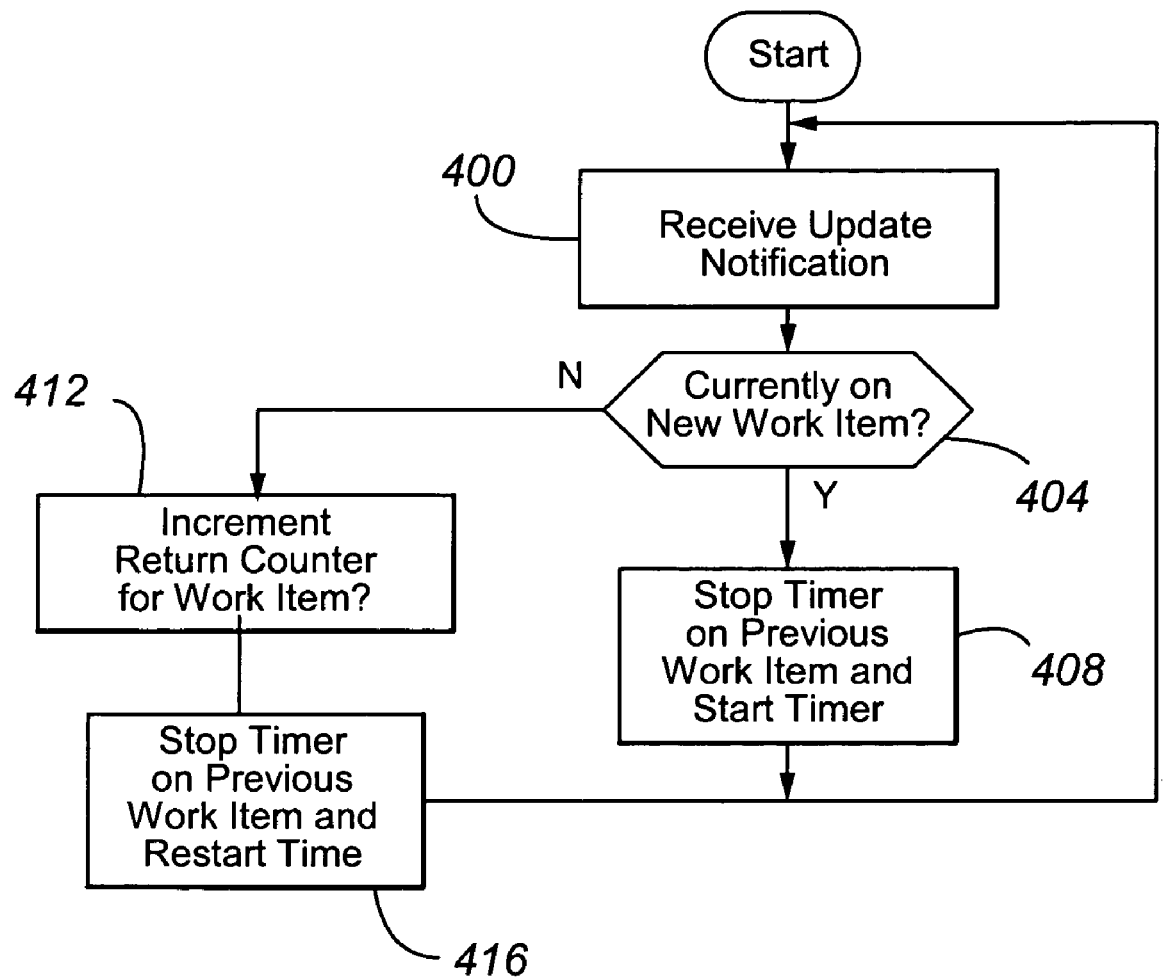
FIG. 4 is a flow chart depicting an operational embodiment of the database updating agent.

Referring now to FIG. 4, the operation of the updating agent 236 will now be discussed.

In step 400 of FIG. 4, the updating agent 232 receives the update notification from the tracking agent 232. In decision diamond 404, the updating agent 232 determines whether the notification involves a newly assigned work item. If so, the updating agent 232 stops a timer for the first work item and starts a timer to track the time that the agent works on the new or second work item. If not, the updating agent 232, in step 412, increments a return counter for the previously assigned work item to indicate the number of times that the agent has returned to the work item. In next step 416, the updating agent 232 stops the timer for the first work item and restarts the timer to continue accumulating time for the agent for servicing the second work item.

Returning again to FIG. 3, the tracking agent 232, after receiving a successful update notification acknowledgment from the updating agent 232, if appropriate, updates the corresponding agent's GUI and/or TUI as described above. The tracking agent 232 then returns to step 300 to await the next marker notification.

A number of variations and modifications of the invention can be used. It would be possible to provide for some features of the invention without providing others.

For example, the server and/or switch can be a software-controlled system including a processing unit (CPU), microprocessor, or other type of digital data processor executing software or an Application-Specific Integrated Circuit (ASIC) as well as various portions or combinations of such elements. The memory may be a random access memory (RAM), a read-only memory (ROM), or combinations of these and other types of electronic memory devices.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) providing a plurality of human agents to service a plurality of work items, the work items being in the form of contacts;
   (b) selecting, by a processor, a first human agent;
   (c) while the first human agent is servicing concurrently first and second work items on different communication media and involving different customers, determining, by a processor, a change in focus by the first human agent by at least one of the following indicators:
      (C1) a cursor location on a display;
      (C2) a cursor activity on the display;
      (C3) an amount of voice energy generated by a communication device of the first agent; and
      (C4) a type of voice energy being received by the agent's communication device, wherein the first work item is a voice call and wherein the determination of step (c) that the first agent had a change in agent focus was made without input from the first agent;
   (d) in response to detecting a change in agent focus, stopping a first timer of service time on the first work item and initiating a second timer of service time on a second work item, wherein, while the second timer is activated, the agent is speaking with a first customer on the first voice call.

2. The method of claim 1, wherein the at least one indicator is (C1).

3. The method of claim 1, wherein the at least one indicator is (C2).

4. The method of claim 1, wherein the at least one indicator is (C3).

5. A computer readable medium encoded with computer executable instructions operable, when executed by the computer, to perform the steps of claim 1.

6. The method of claim 1, wherein the at least one indicator is (C4).

7. A method, comprising:
   (a) while an agent is servicing simultaneously first and second work items on different communication media and involving different customers, detecting, by a processor, a change in agent focus by the agent from the first work item to the second work item, wherein the detection of change in agent focus is based on one or more of the following:
      (i) cursor location on a display,
      (ii) cursor activity on the display,
      (iii) an amount of voice energy being transmitted from a communication device of the agent,
      (iv) a type of voice energy being received by the agent's communication device, and
      (v) a movement of the agent;
   (b) in response to detecting the change in agent focus, stopping, by a processor, a first timer of work time on servicing of the first work item and initiating a second timer of work on servicing of the second work item, wherein the first work item is a first voice call and wherein, while the second timer is activated, the agent is speaking with a first customer on the first voice call.

8. The method of claim 7, wherein the change in agent focus is indicated by a marker notification and wherein the notification indicates the occurrence of (i).

9. The method of claim 7, wherein the change in agent focus is indicated by a marker notification and wherein the notification indicates the occurrence of (ii).

10. The method of claim 8, further comprising:
    (c) in response to the occurrence of (i), causing, automatically, at least one of a Graphical User Interface (GUI) and Telephone User Interface (TUI) of the agent to be returned automatically to a previous configuration associated with the second work item or turned to a different configuration associated with the second work item.

11. The method of claim 10, wherein the at least one of a GUI and TUI is returned to the previous configuration and wherein the previous configuration is a display of information previously displayed to the agent and is related to the second work item.

12. A computer readable medium encoded with computer executable instructions operable, when executed by the computer, to perform the steps of claim 7.

13. The method of claim 7, wherein the change in agent focus is indicated by a marker notification and wherein the notification indicates the occurrence of at least one of (i) and (ii) and further comprising:
    (c) while the agent is working on the first work item, identifying a cursor location and/or a cursor activity in a display or portion thereof associated with the second work item; and
    (d) in response, generating the marker notification.

14. The method of claim 7, further comprising:
    (c) while the agent is working on the first work item and before work on the first work item has been completed, determining that the agent has previewed the second work item for a predetermined time, the first and second work items being concurrently assigned to the first human agent for servicing; and
    (d) in response, generating the marker notification.

15. The method of claim 7, wherein the change in agent focus is indicated by a marker notification and wherein the notification indicates the occurrence of (iii) and wherein the first work item is a voice call and further comprising:
    (c) detecting, for a selected length of time, voice energy from only one node over the first communication medium, the only one node being associated with a contactor associated with the first work item;
    (d) in response, generating the marker notification.

16. The method of claim 7, wherein the change in agent focus is indicated by a marker notification and wherein the notification indicates the occurrence of (iv) and wherein the first work item is a voice call and further comprising:
    (c) monitoring an amount and/or type of voice energy being transmitted and/or received by the agent while the agent is servicing the first work item;
    (d) in response, generating the marker notification.

17. The method of claim 7, further comprising:
    (c) while the agent is working on the first work item, restricting at least one of what can be done and viewed by the agent with respect to the second work item until the agent activates the second work item.

18. The method of claim 7, wherein the change in agent focus is indicated by a marker notification, wherein the change in agent focus is determined based on (v) and further comprising:
  (c) in response to receipt of the marker notification, at least one of placing, automatically, on hold the voice call and muting, automatically, a talk path of the voice call, the talk path extending from the agent to a customer, whereby the agent can hear the customer but the customer cannot hear the agent.

19. The method of claim 18, wherein the agent, to resume the voice call, must, as appropriate, at least one of remove the call from on-hold status and unmute the talk path.

20. The method of claim 18, further comprising:
  (d) when at least one of the voice call is removed from on hold status and the talk path is unmuted, returning at least one of a Graphical User Interface (GUI) and a Telephone User Interface (TUI) to a prior configuration associated with the first work item.

21. The method of claim 7, further comprising:
tracking an amount of time the agent has had more than one work item active.

22. The method of claim 7, wherein the agent did not indicate the change in agent focus.

23. A system, comprising:
a plurality of human agents to service work items;
a plurality of queues to receive work items awaiting service; and
a processor operable to:
  (a) while an agent is servicing simultaneously first and second work items on different communication media and involving different customers, detect a change in agent focus by the agent from the first work item to the second work item, wherein the detection of change in agent focus is based on one or more of the following:
    (i) cursor location on a display,
    (ii) cursor activity on the display,
    (iii) an amount of voice energy being transmitted from a communication device of the agent,
    (iv) a type of voice energy being received by the agent's communication device, and
    (v) a movement of the agent,
  wherein the first work item is a first voice call and wherein, while a second timer is activated, the agent is speaking with a first customer on the first voice call; and
  (b) in response to detecting the change in agent focus, stop a first timer of work time on servicing of the first work item and initiating the second timer of work on servicing of the second work item.

24. The system of claim 23, wherein the change in agent focus is indicated by a marker notification and wherein the notification indicates the occurrence of (i).

25. The system of claim 23, wherein the change in agent focus is indicated by a marker notification and wherein the notification indicates the occurrence of (ii).

26. The system of claim 24, further comprising the operation:
  (c) in response to the occurrence of (i), cause, automatically, at least one of a Graphical User Interface (GUI) and Telephone User Interface (TUI) of the agent to be returned to a previous configuration associated with the second work item or turned to a different configuration associated with the second work item.

27. The method of claim 26, wherein the at least one of a GUI and TUI is returned to the previous configuration and wherein the previous configuration is a display of information previously displayed to the agent and is related to the second work item.

28. The system of claim 23, wherein the change in agent focus is indicated by a marker notification, wherein the notification indicates the occurrence of at least one of (i) and (ii) and further comprising the operations:
  (c) while the agent is working on the first work item, identify a cursor location and/or a cursor activity in a display or portion thereof associated with the second work item; and
  (d) in response, generate the marker notification.

29. The system of claim 23, wherein the change in agent focus is indicated by a marker notification and further comprising the operations:
  (c) while the agent is working on the first work item, identify a passage of a predetermined time before work on the second work item by the agent is indicated as being completed, the first and second work items being concurrently assigned to the first human agent for servicing; and
  (d) in response, generate the marker notification.

30. The system of claim 23, wherein the change in agent focus is indicated by a marker notification, wherein the notification indicates the occurrence of (iii) and further comprising the operation:
  (c) detect, for a selected length of time, voice energy from only one node over the first communication medium, the only one node being associated with a contactor associated with the first work item;
  (d) in response, generate the marker notification.

31. The system of claim 23, wherein the change in agent focus is indicated by a marker notification, wherein the notification indicates the occurrence of at least one of (iii) and (iv) and further comprising the operation:
  (c) monitor an amount and/or type of voice energy being transmitted and/or received by the agent while the agent is servicing the first work item;
  (d) in response, generate the marker notification.

32. The system of claim 23, wherein the change in agent focus is indicated by a marker notification, wherein the notification indicates the occurrence of (v) and further comprising the operation:
  (c) while the agent is working on the first work item, restrict at least one of what can be done and viewed by the agent with respect to the second work item until the agent activates the second work item.

33. The system of claim 23, further comprising the operation:
  (c) in response to receipt of the marker notification, at least one of place, automatically, on hold the voice call and mute, automatically, a talk path of the voice call, the talk path extending from the agent to a customer, whereby the agent can hear the customer but the customer cannot hear the agent.

34. The system of claim 33, wherein the agent, to resume the voice call, must, as appropriate, at least one of remove the call from on-hold status and unmute the talk path.

35. The system of claim 33, further comprising the operation:
  (c) when at least one of the voice call is removed from on hold status and the talk path is unmuted, returning at least one of a Graphical User Interface (GUI) and a Telephone User Interface (TUI) to a prior configuration associated with the first work item.

36. The system of claim 23, wherein the processor tracks an amount of time the agent has had more than one work item active.

37. The system of claim 23, wherein the agent did not indicate the change in agent focus.

* * * * *